United States Patent [19]
Klein et al.

[11] Patent Number: 6,058,333
[45] Date of Patent: May 2, 2000

[54] ANIMATION OF EXECUTION HISTORY

[75] Inventors: Michael T. Klein; William Perry Su; Richard Leroy Mahn, all of Ann Arbor, Mich.; Per-Ola Gustav Forsgren, Solna, Sweden

[73] Assignee: Steeplechase Software, Inc., Ann Arbor, Mich.

[21] Appl. No.: 08/890,895

[22] Filed: Jul. 10, 1997

Related U.S. Application Data

[60] Provisional application No. 60/023,341, Aug. 27, 1996.

[51] Int. Cl.$^7$ .................................................... G05B 9/02
[52] U.S. Cl. ............................. 700/83; 345/348; 345/970
[58] Field of Search .................................... 345/348, 349, 345/356, 965, 970; 700/18, 17, 83

[56] References Cited

U.S. PATENT DOCUMENTS

| | | | |
|---|---|---|---|
| 4,872,167 | 10/1989 | Maezawa et al. | 364/237.2 |
| 5,005,119 | 4/1991 | Rumbaugh et al. | 364/191 |
| 5,392,207 | 2/1995 | Wilson et al. | 364/147 |
| 5,414,847 | 5/1995 | Tsukakoshi | 364/286 |
| 5,644,487 | 7/1997 | Duff et al. | 364/167.02 |

*Primary Examiner*—William Grant
*Assistant Examiner*—Zoila Cabrera
*Attorney, Agent, or Firm*—Rader, Fishman & Grauer PLLC

[57] ABSTRACT

A digital computer implemented software system is provided which translates a control program into a graphical flow chart and displays the same upon a visual display attached to the digital computer during execution of a control program. The graphical flow chart includes multiple flow paths of execution, each flow path having a respectively associated binary memory location. Each memory location has an initial value of zero, and the value of a particular memory location increases to one upon execution of the control program along the flow path associated with that particular memory location. When a memory location has a value of one, the flow path associated therewith is visually enhanced upon the visually displayed graphical flow chart. A user is provided with a function to reset each memory location value to zero at any time during execution of the control program.

6 Claims, 5 Drawing Sheets

ANIMATION OF EXECUTION HISTORY

This application claims priority to copending Provisional Application No. 60/023,341 filed on Aug. 27, 1996.

FIELD OF THE INVENTION

The present invention relates generally to the control of industrial equipment and processes. More particularly, the invention relates to graphical flow charts which indicate logic flow concurrently with the execution of the underlying control program.

BACKGROUND OF THE INVENTION

The vast majority of industrial processes, by definition, consist of a series of sequential or concurrent steps, each step involving one or more actions to be taken by a machine or machines. The steps may occur at specific times and in a specified sequence according to specific parameters, or may occur in response to specific events. Each step may have one or more elements, each element describing activities or operations with greater specificity.

In the past, industrial equipment was commonly controlled directly by interfacing the equipment with a programmable logic controller, or "PLC". A PLC is a solid-state device designed to perform logic functions previously accomplished by electromechanical relays. The PLC uses output modules to actuate the industrial equipment in response to physical stimuli which the PLC is programmed by the operator of the system to recognize through input modules. PLCs, which still find wide use today, are usually programmed using either ladder logic or sequential function charts. Because of the cryptic nature of ladder logic, it is inherently complex and difficult and time consuming to debug and maintain.

More recently, manufacturers have sought to take advantage of the greater flexibility of general-purpose computers, including inexpensive commercially available personal computers, or "PCs", to enhance the efficiency associated with creating and maintaining software programs used to control industrial processes. Because general purpose computers can be programmed in high level commercially available languages such as BASIC, FORTRAN, C, or in object-oriented languages such as C++, manufacturers and process control vendors have been able to develop PC-based control systems that emulate traditional PLC functions, but do it in such a way that permits them to be easy to use, program and maintain, while still offering significant cost savings over dedicated PLC-based solutions.

In many instances when a PLC is used, the PLC is connected to a central control computer. In such an arrangement, the PLC plays its own dedicated role controlling the industrial process at hand while concurrently communicating information back to the central computer. By using the high level commercially available programming languages, control methods have evolved using graphical flow charts to aid the software programmer developing control programs which can emulate traditional PLC functions. Use of PCs in this way enable a manufacturer to develop and run the operator interface on the same PC and share data with other WINDOWS based programs through dynamic data exchange. Thus, a single PC may perform the function of the programmable logic controller, the operator panel, the programming terminal, and the real time system simulator. A PC therefore can replace three separate components: PLC programming terminal, PLC processor, and operator interface. By implementing a PC-based control system, manufacturers are able to lower control system investment costs, increase productivity in design and industrial operations, and reduce down time with built in flow chart based diagnostics.

The development of any application program requires that the developer understand how the program executes its logic steps. In this phase of control application development, often known as "debugging", the developer must have the ability to inspect variables and their values. Typically, this requires the user to analyze data and correlate that data with the control program, which can be extremely burdensome on the programmer. However, there also must be a way to detect where a program is executing because simple evaluation of data may limit the programmer's understanding of the program only to the microscopic effects rather than providing an understanding of the program's effects at the transaction level. One particular difficulty is that the controlling program must often execute many times per second whereas the application engineer is only capable of comprehending information at a much slower rate. Additionally, multiple variables may change their values several times during any cycle of the controlling program. Debugging is usually a time-consuming and frustrating process for the applications engineer. The frustration can be reduced by using object oriented programming techniques. Manufacturers and applications engineers are therefore very interested in new methods for increasing the efficiency associated with developing control programs.

SUMMARY OF THE INVENTION

The present invention is directed to a software system which accumulates execution information on the run time side of a controlling program and displays it to the user. The software system utilizes a control program which includes graphical flow charts for development and debugging of the controlling program. Each unique execution logic path on the graphical flow chart is assigned a bit location in memory. As a result, each address location uniquely corresponds to a flow chart logic path. As the flow chart logic executes, each time a particular path is taken, its associated bit is assigned a value of "1". Additionally, each path on the graphical flow chart is drawn on a video display in a color or other visual manner which reflects the state of its associated bit. The user is allowed to change the state of all bits to "0" to set an initial condition or to reset conditions in the middle of the control program execution or at any time during debugging. Each time the execution in the run time has a choice of logic paths to take, the invention marks the bit location corresponding to the particular path that was taken. A path taken during execution may be displayed to the user in a fashion that distinguishes it from paths not taken on a debugging graphical flow chart. The user is provided with a function to reset all of these path bits, such that the display then will show all paths executed after the reset. Thus, the bits can be reset by the user at any time so that a fresh trace is shown.

Through the present invention, control program developers are provided with a software tool which decreases the time it takes to debug a control program, and which allows simultaneous evaluation of multiple data points while identifying execution paths on the graphical flow chart. Reducing the time an engineer spends debugging a control program shortens the time to implementation of that control program and increases productivity of both the engineer and the industrial process. Thus, the manufacturer achieves faster design cycles at a lower down time than existing PLC technology or existing graphical user interface programming tools.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
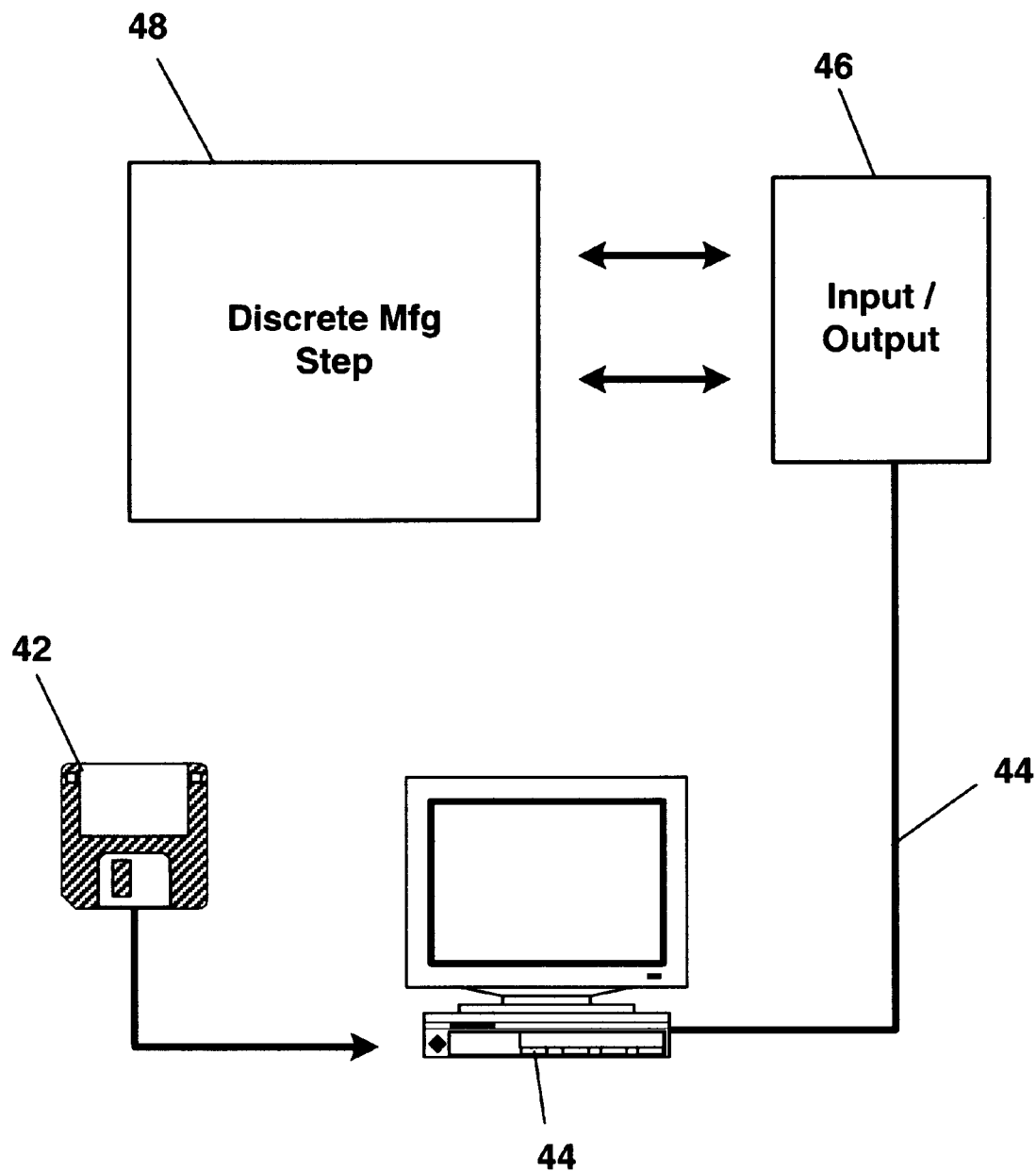
FIG. 1 is a diagrammatic block view of the hardware of the present invention.

Now referring to FIG. 1, the control program hardware apparatus includes a digital computer 40 and controlling program software embodied on floppy disk 42. In a typical hardware arrangement, computer 40 is connected 44 to input/output device 46. Input/output device 46 is controlled via the control program software 42 and interacts with a discrete industrial step 48 which is a subpart of a industrial process. Each discrete industrial step 48 occurs at a predetermined time, or in response to a predetermined parameter, which is either supplied by or measured by input/output device 46, or both. Input/output device 46 thus provides the external stimuli to digital computer 40, in response to which the control program may cause other industrial events to occur.

Using known methods and commercially available control program software packages, an applications engineer may construct a control program for an industrial application. Some commercially available software packages allow for a control program to be constructed only in graphical flow chart form. However, any control program is capable of being described through the use of a flow chart, such as chart 10 shown in FIG. 2. In a simple demonstrative program depicted by flow chart 10 in FIG. 2, a continuous loop program initiates from the terminal point labeled start. Several decision points 12, 14, 16 and 18 are serially arranged within the program. Each decision point 12, 14, 16 and 18 determines which of the many possible alternative paths to follow. According to chart 10, a "no" answer at a decision operator results in the process passing to the next decision operator. Alternatively, a "yes" response to a decision operation results in a path to a processing function 20, 22, 24, 26 or 28. Upon completion of a processing function 20, 22, 24, 26 or 28, the program described in chart 10 returns to the first decision operator 12 and executes once more.

Figure 2:
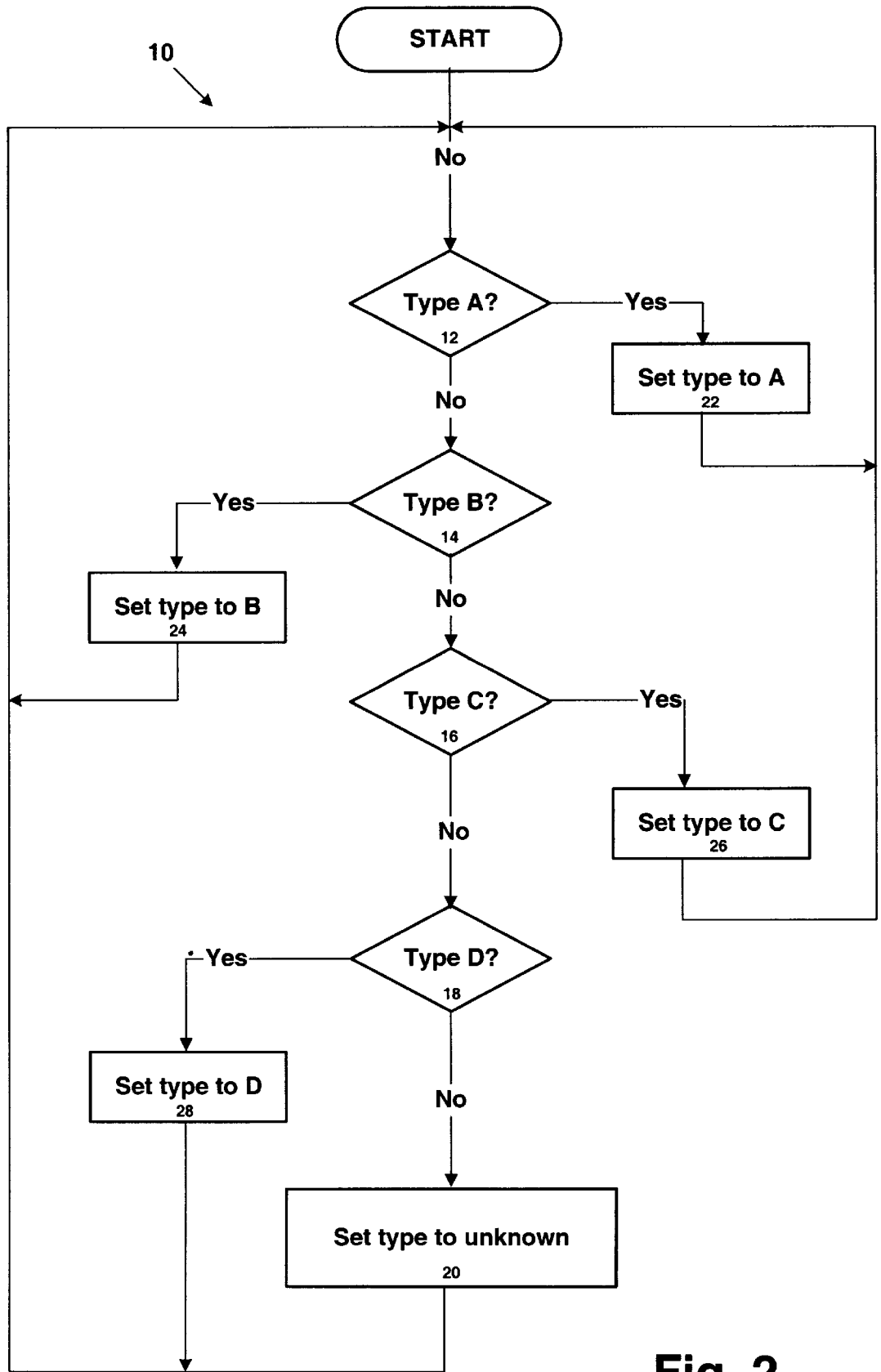
FIG. 2 is an example of a flow chart in a typical control application as depicted through known graphical flow chart technology.

When a control program such as embodied in chart 10 of FIG. 2 is created, and before the program is made operational within an industrial process, the program must be tested and/or debugged to ensure intended operation. Debugging operations typically involve a step approach, wherein each step of the operation is checked against expected values, and upon verification of the correct values, the program is allowed to continue with additional step or steps. In the step approach, the system used for debugging often limits the user to a display of the functional status of each of the inputs or outputs affected by the program that are designated by the user. Thus for example, the program used to carry out the logic steps depicted in flow chart 10 of FIG. 2 would be tested or debugged by allowing execution to continue past one of the processing functions 20, 22, 24, 26 or 28, at which time a value or set of values would be checked against an expected result. Alternatively or concurrently, as applied to FIG. 2, conventional debugging would require that a stop point be inserted after one or more of decision operations 12, 14, 16 or 18. When the program reaches a stop point inserted by the developer, the developer may then check the value of variables. In either case, evaluation of variables requires interruption of execution of the program.

Using the present invention, however, debugging and evaluation of a control program may be simply and easily performed utilizing graphical representations of a simple flow chart diagram. Since every control program may be represented with a flow chart, this software invention finds wide application. In a preferred embodiment, a programmer uses a commercially available graphical flow chart software package to program a digital computer to control an industrial step.

Figure 4:
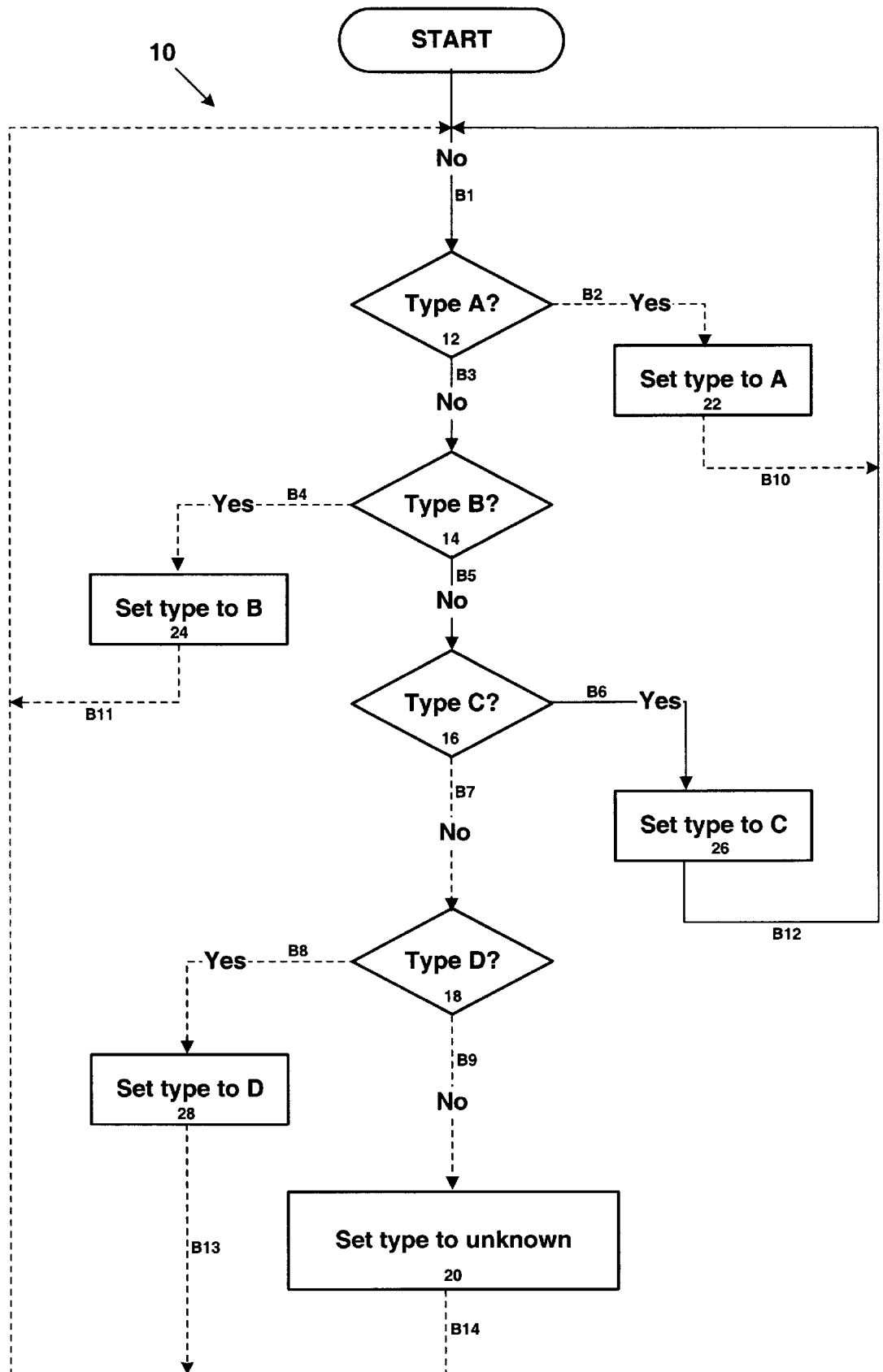
FIG. 4 is an example of an animated flow chart of FIG. 3 implemented in accordance with the present invention.
Figure 5:
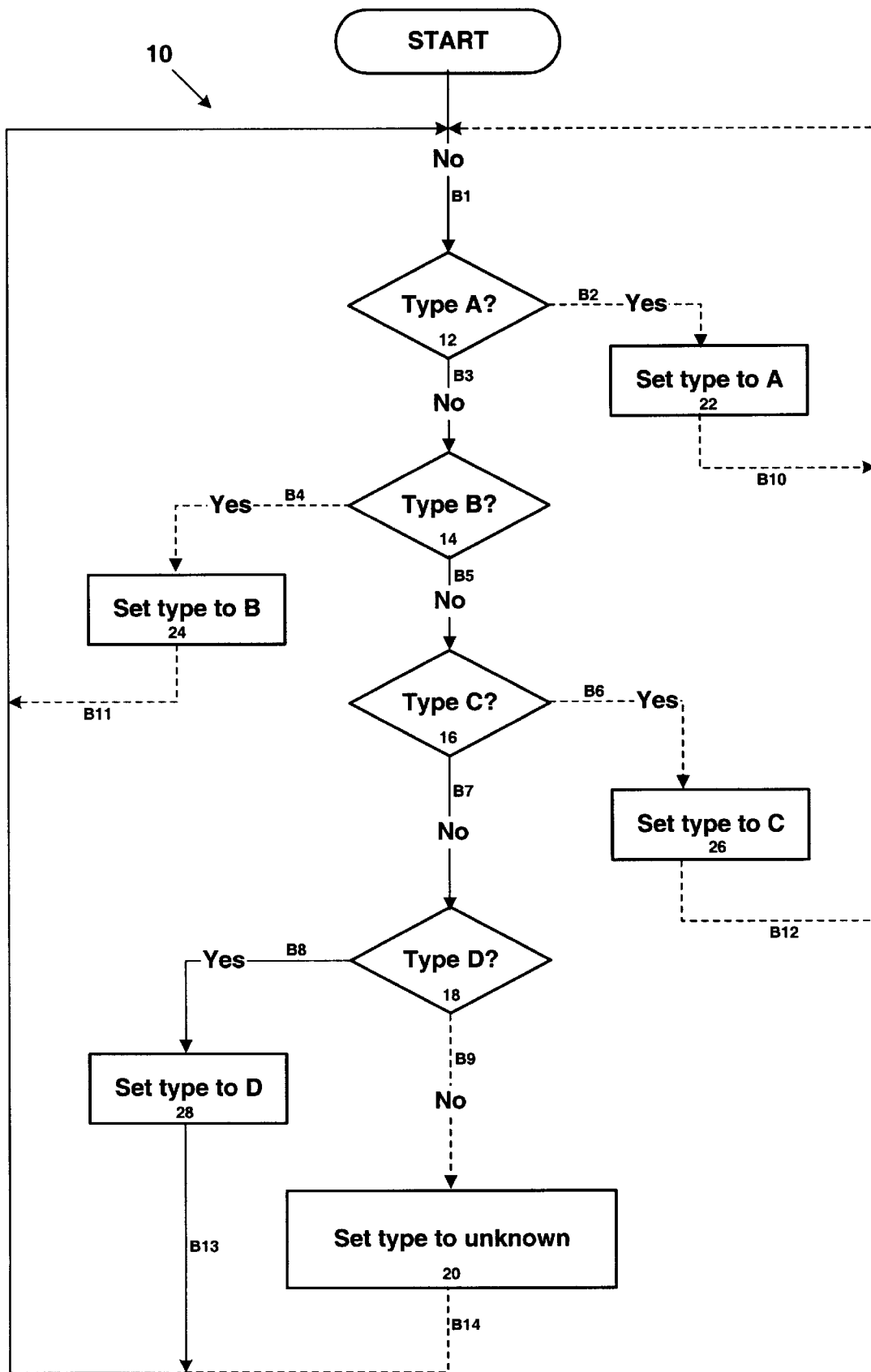
FIG. 5 is a further example of an animated flow chart of FIGS. 3 and 4 implemented in accordance with the present invention.

In operation, a graphical flow chart is developed to control input/output devices directly from the PC according to accepted methods. The graphical flow chart is displayed upon a visual screen attached to the digital computer upon which the control program is in operation. According to the present invention, each possible alternative flow path on the flow chart diagram is assigned a memory location, known as a "bit". Each bit associated with an alternative path on the flow chart diagram is allowed one of two possible binary values. Either the bit is actuated and has a value of "1" or else the bit is not actuated and maintains a value of "0". A bit is actuated if, during execution of the control program, the flow chart path represented by that bit is followed by the program. The program is allowed to run for an operator-selected period of time. After such a period of time, or at any time during execution of the program, the developer is able to halt execution of the program both to see where a program is executing and to evaluate the value of variables within the program. Evaluation of where the program is executing is simplified because only those paths which have been taken by the program are highlighted on the visual screen, either as solid lines, as shown in FIGS. 4 and 5, or else as different colors. The operator is thus instantly able to tell where the program is and has been executing. Additionally, since each processing function represents a change in value, the highlighted flow path instantly identifies the value of the variable evaluated at each processing function.

Figure 3:
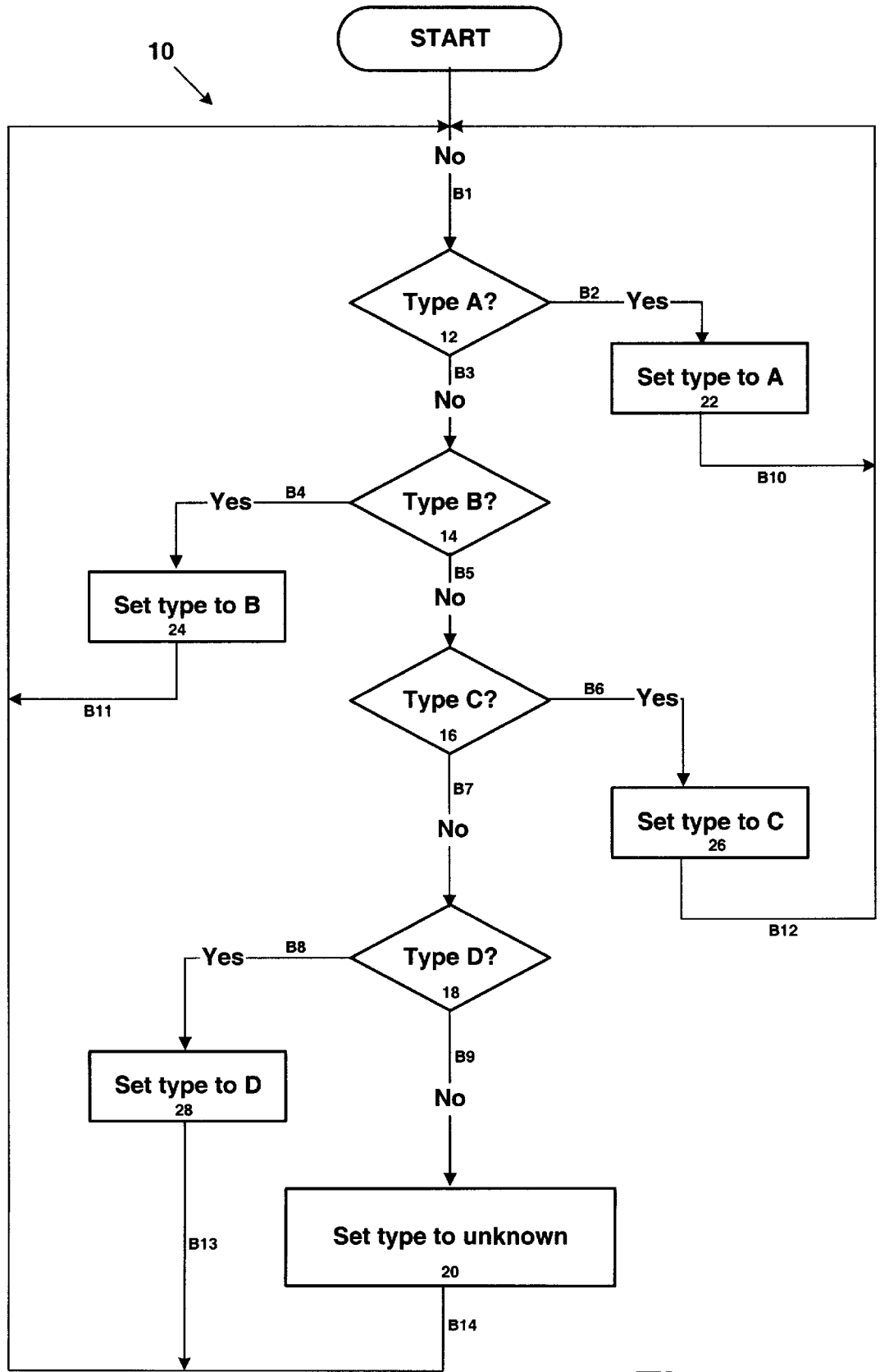
FIG. 3 is the flow diagram of FIG. 2 implemented with the present invention.

FIG. 3 shows the program flow chart diagram of FIG. 2 slightly modified in accordance with the present invention, with each alternative path in the flow chart assigned a unique bit. In FIG. 3, flow chart unique alternative paths have been assigned address location numbered B1 through B14. Before execution of the program, all bits have a value of "0". Upon initial starting of the program represented by chart 10 in FIG. 3, B1 is addressed and is assigned a value of "1". After decision point 12 of the program, either of addresses B2 or B3 would be actuated and be assigned a value of "1". Thus, as the flow chart executes, each time a particular path is taken, its associated bit is set to a "1". Since each address corresponds to a particular path of execution until the next path decision point, each unique flow execution path is represented by a unique combination of bit values stored within the address locations.

FIGS. 4 and 5 demonstrate one embodiment of the visual display created by the software of the present invention for operation of the invention on two different flow paths along flow chart 10. Those paths for which the associated memory address has a value of "1" are emphasized and displayed to the user on the video display screen in a fashion that distinguishes those paths taken from those paths not taken. As applied to chart 10 in FIG. 4, an evaluation of the memory addresses for each alternative pathway of the flow chart 10 reveals the following:

TABLE 1

| Memory Address | Value |
| --- | --- |
| b1 | 1 |
| b2 | 0 |
| b3 | 1 |
| b4 | 0 |
| b5 | 1 |
| b6 | 1 |
| b7 | 0 |
| b8 | 0 |
| b9 | 0 |
| b10 | 0 |
| b11 | 0 |
| b12 | 1 |
| b13 | 0 |
| b14 | 0 |

The set of memory bit values shown in Table 1 represents a unique path through chart 10. The memory locations having actuated bits, i.e., those having a value of "1", are represented to the programmer on the graphical flow chart shown on the video display in a fashion that distinguishes it from logic paths not taken. In FIG. 4, the path taken is represented by the solid line arrows, while paths not taken are represented by the dashed line arrows. Visual distinction of paths taken may be represented in various ways, including changing the color on the video display of each path taken such that it is distinguished from paths not taken, or by any other conventional means of emphasis.

In addition, the user of the invention is allowed to change the value of all bits to "0" at any time. In operation, the software provides the user with a function to reset all of the path bits, such that the display then will show only those paths executed after the reset of the memory bits. An alternative execution path is demonstrated in FIG. 5. A chart of memory bit values for associated flow paths taken in FIG. 5 is located in Table 2.

TABLE 2

| Memory Addresses | Value |
| --- | --- |
| b1 | 1 |
| b2 | 0 |
| b3 | 1 |
| b4 | 0 |
| b5 | 1 |
| b6 | 0 |
| b7 | 1 |
| b8 | 1 |
| b9 | 0 |
| b10 | 0 |
| b11 | 0 |
| b12 | 0 |
| b13 | 1 |
| b14 | 0 |

As in Table 1, the set of memory bit values shown in Table 2 represent an alternative unique path through chart 10. The actuated bits, i.e., those having a value of "1", are represented to the programmer on the graphical flow chart shown on the video display in a fashion that distinguishes it from paths not taken.

The present invention provides a tool for control program developers which decreases the time it takes to debug a control program because of the increased ability to evaluate variables and to precisely determine the logic flow path of a control program. The present invention also allows simultaneous evaluation of multiple data points while identifying execution paths on a visual display of a graphical flow chart. By reducing the amount of time a programmer spends debugging a control program, implementation of that control program is hastened and productivity of the software implementation increases. Thus, the programmer may achieve faster software implementation and less manufacturing down time than that currently afforded by existing PLC technology or existing graphical user interface programming tools.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A computer implemented software method for indicating logic flow concurrently with the execution of an underlying control program and displaying the same to a user through graphical flow charts, comprising the steps of:

(a) displaying on a digital computer video display screen a graphical flow chart having a plurality of flow paths, wherein said graphical flow chart is representative of a control application;

(b) assigning a memory location to each unique flow path shown on the graphical flow chart;

(c) storing values in said memory locations associated with each unique flow path, wherein said values are indicative of the current logic flow of the control application; and (d) visually enhancing the display of each unique flow path corresponding to those values indicative of the current logic flow of the control application.

2. A computer implemented software method as recited in claim 1, further comprising the step of allowing the user to change said values during execution of the control program.

3. A computer readable storage device having a program thereon used to direct an on-site computer to indicate logic flow concurrently with the execution of an underlying control program and display the same to a user through graphical flow charts, said storage device programs comprising the steps of:

(a) displaying on a digital computer video display screen a graphical flow chart having a plurality of flow paths, wherein said graphical flow chart is representative of a control application (b) assigning a memory location to each unique flow path shown on said graphical flow chart;

(c) storing values in said memory locations associated with each unique flow path, wherein said values are indicative of the current logic flow of the control application; and (d) visually enhancing the display of each unique flow path corresponding to those values indicative of the current logic flow of the control application.

4. The device of claim 3, further including the steps of (e) providing a function whereby all values are reset at the discretion of the user during control program execution to values not indicative of the current logic flow of the control application.

5. A system for accumulating execution information on a run time side of a digital computer controlled application and displaying the same to a user through graphical flow charts, comprising the steps of:

(a) means for displaying on a digital computer video display screen a graphical flow chart having a plurality of flow paths, wherein said graphical flow chart is representative of a control application;

(b) means for assigning a memory location to each unique flow path shown on the graphical flow chart;

(c) means for storing values in said memory locations associated with each unique flow path, wherein said values are indicative of the current logic flow of the control application;

(d) means for visually enhancing the display of each unique flow path corresponding to those values indicative of the current logic flow of the control application.

6. The system of claim 5, further including means for resetting values at the discretion of the user during control program execution to values not indicative of the current logic flow of the control application.

* * * * *